H. E. CONGER AND C. W. WALLER.
CARCASS SPLITTING MACHINE.
APPLICATION FILED MAY 24, 1918.
1,313,579.
Patented Aug. 19, 1919.
2 SHEETS—SHEET 1.
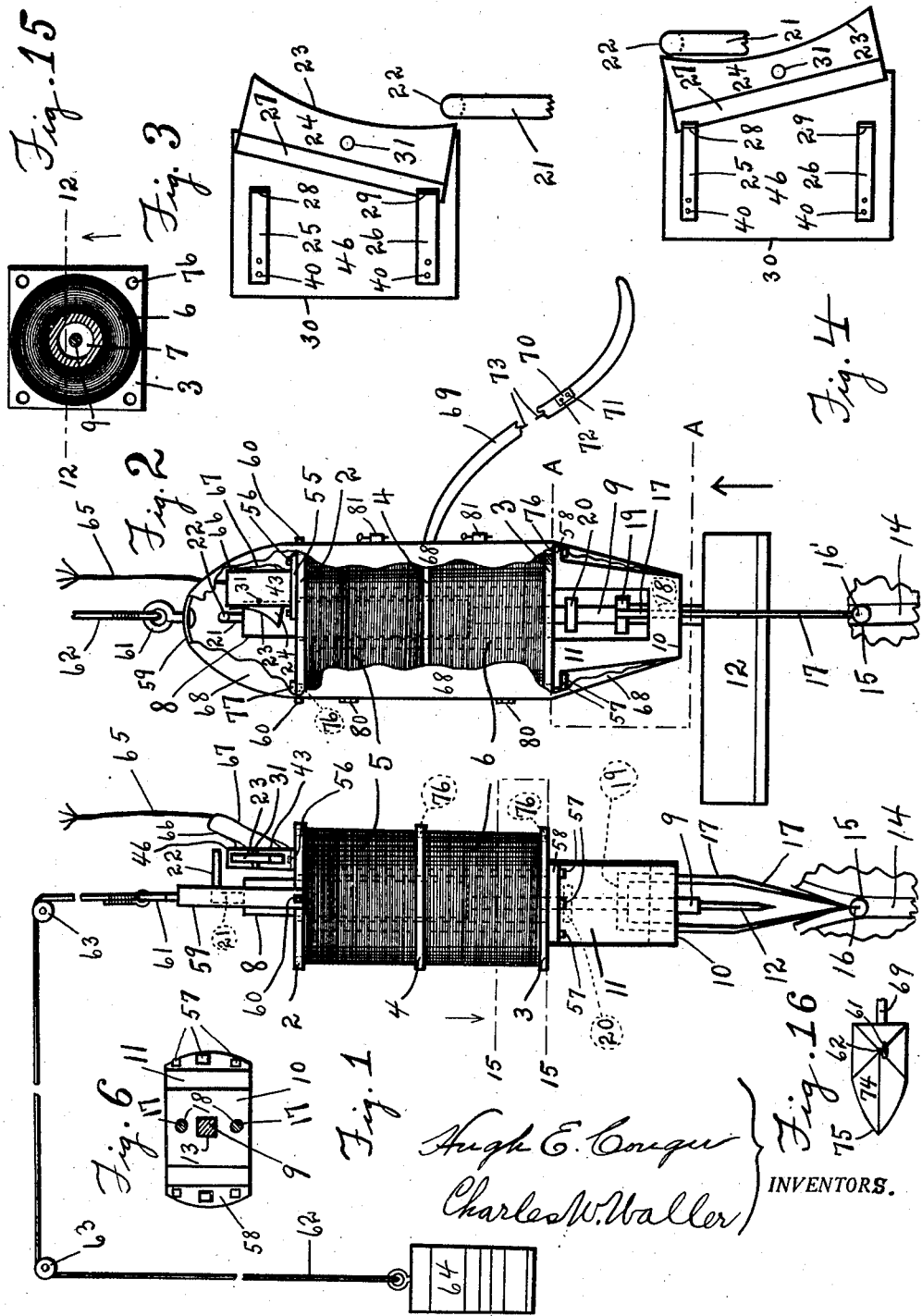
Hugh E. Conger
Charles W. Waller
INVENTORS.

H. E. CONGER AND C. W. WALLER.
CARCASS SPLITTING MACHINE.
APPLICATION FILED MAY 24, 1918.
1,313,579.
Patented Aug. 19, 1919.
2 SHEETS—SHEET 2.
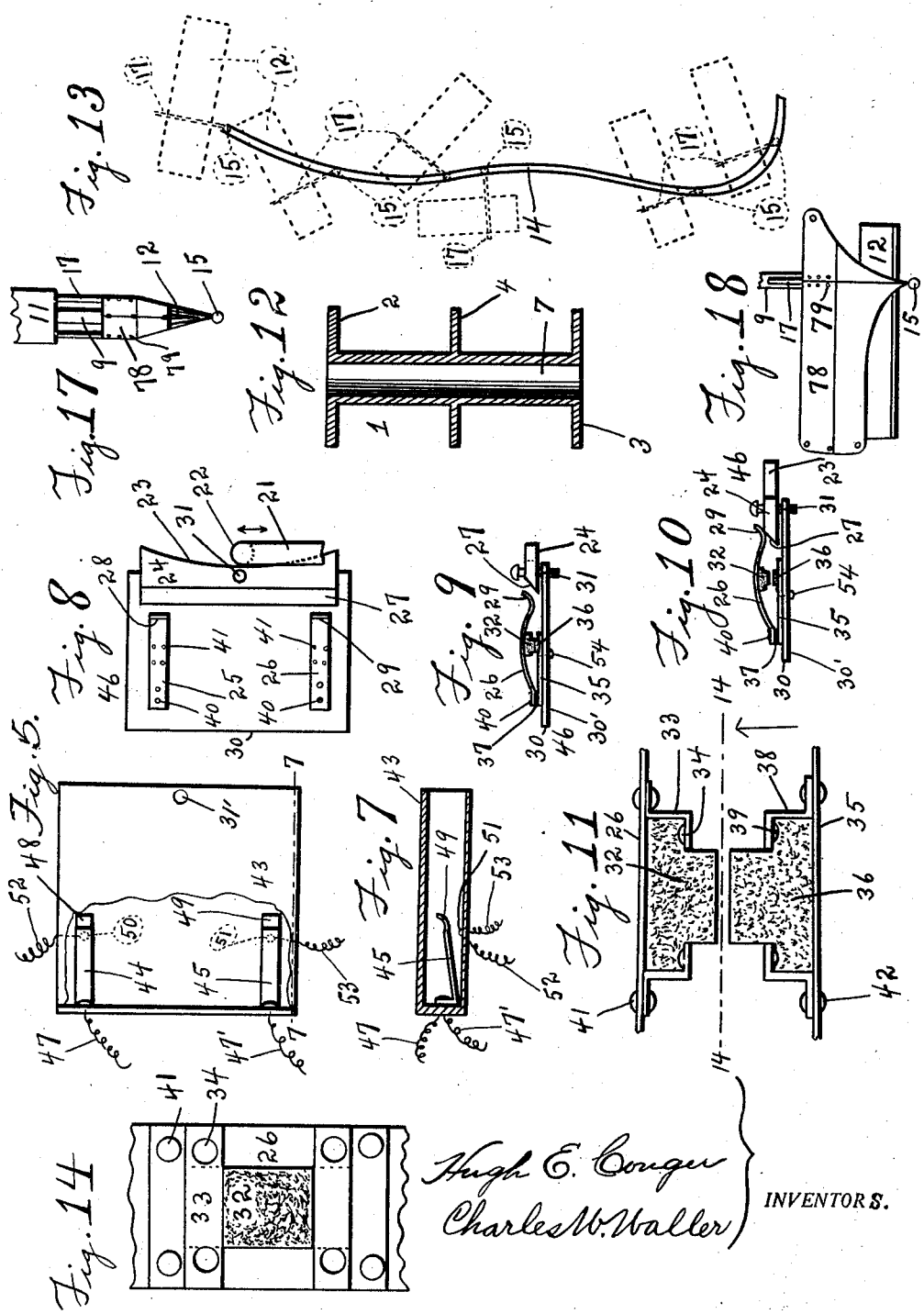
INVENTORS.

UNITED STATES PATENT OFFICE.

HUGH E. CONGER AND CHARLES W. WALLER, OF CHICAGO, ILLINOIS.

CARCASS-SPLITTING MACHINE.

1,313,579.　　　　　Specification of Letters Patent.　　Patented Aug. 19, 1919.

Application filed May 24, 1918. Serial No. 236,299.

*To all whom it may concern:*

Be it known that we, HUGH E. CONGER and CHARLES W. WALLER, citizens of the United States, residing at Chicago, in the county of Cook and State of Illinois, have invented a new and useful Carcass-Splitting Machine, of which the following is a specification.

This invention relates to machines adapted for use during the performance of the operation of splitting or dividing meat carcasses through the backbones or vertebræ and is intended to economize labor in slaughter houses, and the main object is to produce a machine which will divide or side a carcass longitudinally through the spines or spinal cord cavity quickly, and embodies novel means, to be hereinafter described, for retaining a cutting member or cleaver in proper relation with the spinal column or spinal cord cavity of a carcass, and to direct or guide said cutting member or cleaver as the work of splitting said carcass progresses.

One object is to provide a machine for the purpose set forth, in which the cutting member or cleaver may perform its function regardless of what position it may take, laterally or fore and aft, relative to the spinal cord cavity of a carcass while said carcass is being split or sided.

Another object is more particularly to provide an improved, simple, small, compact, efficient, light, strong and reliable machine for electrically, rapidly and conveniently splitting the carcasses of beeves and other animals intended for food, whereby the work of separating or dividing carcasses in the preparation of meat for the market is facilitated, the machine embodying a cutting, chopping, or cleaver member in contradistinction to a rotary or other form cutter of the saw type, the latter being objectionable because of the discoloration resulting from its use and attributable to the teeth of the saw drawing the blood and other matter (which becomes heated through friction) over the surface of the bone and meat to quickly decompose and thus contaminate the meat and injure the value thereof.

The present invention provides a machine which is so constructed and counterbalanced as to be easily manipulated by one person, thereby greatly reducing the cost incident to splitting carcasses along the vertebræ so as to provide sides for convenience of handling and transportation.

A further purpose of the invention is to devise a machine particularly adapted for use in slaughter and packing houses to take the place of the generally used cleaver, the knob, ball or enlargement forming the essential or guide part of the invention. The said machine also embodying a cutting member or cleaver arranged to operate by a reciprocating motion, thereby retaining all the advantages incident to the use of a cleaver for separating carcasses into desired pieces, by means of a reciprocating electric motor automatically controlled by means of an electric current switched or diverted from one stationary magnetic coil or solenoid to another, adapted to be thus energized alternately by means of an automatically alternately controlled switch attached to the machine and the magnetic field alternately thereby causing the core or plunger of said solenoids to reciprocate.

A further object is to provide a machine of the class described which can be easily handled, raised and lowered by a single operator, thus to more quickly perform the operation of splitting food carcasses than has heretofore been done by the use of the hand cleaver.

To the attainment of the aforesaid and other objects, advantages and ends our invention consists in the novel details of construction, and in the combination, connection and arrangement of parts hereinafter more fully described, and then pointed out in the claims.

In the accompanying drawings which form a part of this application and in which similar characters of reference are used to indicate the same parts throughout the several views, we have illustrated one practical embodiment of the invention, but the construction shown therein is to be understood as illustrative, only, and not as defining the limits of the invention.

Figure 1 is a rear view of the machine suspended from above by a cable passing over pulleys to a counterbalance weight and showing the knob or ball guide occupying the spinal cord cavity of a section of a carcass being split;

Fig. 2 is a side view of the machine showing a portion of the machine housing or casing and the lower flange and cable removed, and also showing the knob or ball guide occupying the said spinal cord cavity of a section of the said carcass being split;

Fig. 3 is a side view of the automatic electric switch illustrating the opposite side from that shown in Fig. 2, and showing the upper contact means or spring closed and the lower one open;

Fig. 4 is a similar view showing the lower contact means or spring closed and the upper one open;

Fig. 5 is a side view of the switch case, illustrating the opposite side from that shown in Fig. 2 and showing a portion of same removed;

Fig. 6 is a bottom view, taken on line A—A of Fig. 2 and looking in the direction of the arrow, of the slidable bearing for the cleaver rod and guide arms;

Fig. 7 is an end view, partly in section, taken on line 7—7 of Fig. 5, of the switch case;

Fig. 8 is a side view of the automatic switch illustrating the opposite side from that shown in Fig. 2, of the horizontal projection on its reciprocating movement to reverse the stroke of the core;

Fig. 9 is an end view of said automatic switch;

Fig. 10 is an end view of said automatic switch showing the lower contact means or spring open;

Fig. 11 is an enlarged view of the contact pieces of the contact means or springs while separated;

Fig. 12 is a sectional view through the double solenoid spool, taken on line 12—12 of Fig. 15, looking in the direction of the arrow, but in which the wire and cleaver rod shown in Fig. 15 have been removed;

Fig. 13 is a diagrammatical side view of the spinal cord cavity of a carcass, illustrating by the dotted lines the various positions which may be taken, fore and aft, by the cleaver relative to said cavity;

Fig. 14 is a plan view of one of the contact springs of the contact means looking in the direction of arrow on line 14—14 of Fig. 11;

Fig. 15 is a plan view of the lower portion of the double solenoid and spool, looking in the direction of the arrow on line 15—15 of Fig. 1;

Fig. 16 is a reduced top plan view of a modified form of cover or casing for the machine proper;

Fig. 17 is a rear view of a guard for the cleaver and the guide arms; and

Fig. 18 is a side view of the same.

The machine of the present invention is provided with an automatic reciprocating electromagnetic motor comprising a double spool or sleeve 1, formed of any suitable non-magnetic material, such as, brass, aluminum, or equivalent material, having an upper flange 2, a lower flange 3 and a center, intermediate or dividing flange 4, said flanges may, if desired, be horizontally circular in form, but in the present instance we show them to be square in form, the flange 4 being adapted to separate or divide the upper coils of wire 5 from the lower coils of wire 6 and suitably insulated, on said spool to form a plurality of independent solenoids, two intermediate flanges being used in order to space said coils, if desired.

In the vertical center of the spool 1 is an opening or passage 7 inside of which a core or plunger 8 of soft iron, solid or laminated, as desired, operates in a vertical reciprocating motion as the current is switched from one solenoid to the other solenoid, and vice versa, by the reciprocating movement of the core or plunger, and the operation of switching the current alternately energizes the solenoids for the purpose of attracting said core in first one direction and then the other, it being effected by the magnetic force when the said solenoids are alternately magnetized and demagnetized, thus forming, in effect, a driving shaft which is reciprocated rapidly by switching the current from one solenoid into the other due to the movement of the plunger itself, said passage acting as a guide for said core or plunger.

Secured to, and extending downwardly from the horizontal center or axis of the lower end of said core 8 is a non-magnetic rod or bar 9, preferably anti-round in shape, as shown in Fig. 6, which rod or bar extends downwardly through and is slidably mounted for reciprocating movement in an opening in the lower end 10 of the (preferably non-magnetic) slidable bearing 11 and forms in effect a slidable shank for, and connects with, a cutting member or cleaver 12, said cutting member being guided in its reciprocal movement by the anti-round shape of the bearing opening or guideway 13 and said shank, which tends to keep the cleaver from turning to one side or the other on a vertical axis, and thus insuring the splitting being done straight and accurately, said cleaver being adapted to be removed from the rod 9 when it is desired to sharpen same or to replace it for any other reason.

The edge of said cutting member may be of any suitable form, fore and aft, such as, curved or straight, or may be inclined in an opposite direction on each side of the rod 9, but said cutting member is preferably longer to the rear and shorter to the front of the rod 9, as shown in Figs. 2 and 18, for the reason that the longer side will encounter bones longer in length than the shorter side of said cutting member.

In order that the said cutting member will cut or split through the center of the spine and spinal cord cavity, as illustrated at 14 in Figs. 1, 2 and 13, a knob or ball guide 15 is secured at 16 to one or two arms 17 by means of a screw or rivet 16′ or other suitable means, such as being threaded and detachably screwed on to said arms 17, and preferably in axial alinement with the core 8 and rod 9, so that the size of knob or ball may be changed, if desired.

As a means of preventing the arms 17 from catching to or being retarded in the fore and aft movement past the split portion of the carcass, the outer side of said arms are anti-tapered or devoid of edges or projections.

In addition to the guideway 13, the bearing 11 is also provided with guideways 18, said guideways 13 and 18 adapted for slidable reception of the lower portion of the rod 9 and the upper portion of the arms 17, respectively, whereby said rod and arms are movable up and down. The said bearing 11 being bifurcated or in the form of an inverted yoke, as shown, or may be closed on all sides, and if desired, the knob or ball guide 15 and arms 17 formed of one piece of material.

The arms 17 extend upwardly from said ball guide through the openings or guideways 18 in the lower end 10 of the bearing 11 and connect with a collar or ring 19, said collar or ring adapted to move reciprocally with the rod 9, the upper portion of said rod being, if desired, circular in cross section, as shown in Fig. 15.

Rigidly secured to the rod 9 above the collar 19 is a second collar or ring 20 which is smaller in diameter than is the passage 7 so that said collar 20 moves with said rod in and out of said passage.

To the upper end of the core or plunger 8 is rigidly secured a vertical stem 21 provided with a horizontal projection 22, said stem and projection, which move with the core 8, are adapted to engage the curved face 23 of the electric non-conductive switch knife 24 to alternately throw the upper and lower ends of said knife into and out of engagement with the contact means or springs 25 and 26, respectively.

In order for the knife 24 to more easily part or separate the contact means or springs 25 and 26, from the base pieces 35, the said knife is provided with a beveled edge 27 and the contact means or springs 25 and 26 having their ends curved outwardly and terminating in points 28 and 29, respectively.

The automatic switch 46 and switch case 43 are removably secured in position to each other operatively by means of a bolt, screw or pivot 31 being passed through the said switch, switch knife and case opening 31', and thus also holding the switch knife in place.

We have provided the contact means or springs with contact pieces 32, preferably of carbon, which are held in position by suitable means, such as angle springs 33, said springs each being provided with locking means 34 for said contact pieces, in the form of projections or elevations, in this instance.

Each of the contact means or springs 25 and 26 have oppositely disposed base pieces 35, preferably stationary and provided with contact pieces 36, also preferably of carbon, and are electrically insulated from each other at their clamped ends by means of an electrical insulation 37. Said contact pieces are, also, held in place by suitable means 38, such as angle springs, which are each provided with locking means 39 for said contact pieces, in this instance in the form of elevations or projections. The said contact springs 25 and 26; electrical insulations 37, base pieces 35 and back 30, all being clamped together firmly in position by suitable means 40, such as rivets or screws, the means 33 and 38 being secured to the contact means or springs 25 and 26 and each of the base pieces 35 by means of rivets or the like 41 and 42, respectively.

The switch case 43, adapted to inclose the automatic switch 46 is provided with contact means or springs 44 and 45 to the ends of which are connected electric wires 47 and 47', respectively, the said contact means or springs 44 and 45 being preferably provided with curved ends 48 and 49, respectively, which permit the switch contact means or springs 25 and 26 to come in contact therewith without being retarded when inserted into the case 43. The said case is also provided with contact means, pieces or buttons 50 and 51 to which are connected electric wires 52 and 53, respectively. The switch 46 is adapted to energize and deënergize the solenoids alternately, thereby imparting a reciprocating action to the core or plunger 8, and when said switch is inserted into the case 43, the contact means or springs 25 and 26, and 44 and 45, respectively, form an electrical connection, and the contact means, pieces or buttons 50 and 51 form an electrical connection with a similar contact means, piece or button 54 at each of the base pieces 35. Said contact means or pieces 54 preferably extend through the back 30 and protrude out from the under side 30' of said back.

If desired, the contact means or pieces 51 and 54 may be yieldable in action, so that when each is engaged by the other, they will, one or both, sink or retreat into a recess in the wall of the case 43 and back 30, respectively, or, if desired, a slot or groove may be formed in the wall of the case 43, running from the contact means or piece 51 to the mouth or opening of said case, into which slot the contact means or piece 54 would fit, and the side 30' of the back 30 could also, if desired, be provided with a like slot or groove which would run from the contact means 54 to the edge to be inserted into the case and said contact means 51 adapted to fit into the slot or groove in said back 30.

The switch case 43 is secured rigidly in place on top of the upper flange 2 of the spool 1, by means of a base 55 held in position by means of rivets or bolts 56.

While we have shown and described a particular form of switch, which is wholly automatic in its action, we do not wish to be understood to limit ourselves to the particular form of switch shown. We have simply constructed and described this form of switch to illustrate more clearly the principle of the operation. Other forms of switches could of course readily be applied.

The bearing 11 is secured to the lower flange 3 of the spool 1 by means of rivets or bolts 57 passing through the bearing projection 58 and into the said spool flange 3.

As a means of supporting the machine during operation and suspending the same from above and same counterweighted so that the machine may be easily raised and lowered, each end of a head or hanger strip 59 is secured to the edge of the upper flange 2 of the spool 1 by means of rivets or bolts 60, the center of the head strip being provided with a swivel joint 61 to which is secured a suspension cable or chain 62 adapted to be attached to overhead means, such as to pass over pulleys 63 to the opposite end of which cable or chain is attached and suspended a counterbalance weight 64 adapted to act as a counterbalance to the machine, which is suspended from the opposite end of said cable or chain, but we wish it understood that the means for supporting the machine may be modified if desired, and preferably said weight being in sections so that it may be adjusted or regulated in its functioning.

As a means of supplying electrical current to the wire coils 5 and 6, an electrical cord 65 is provided containing electrical wires 66 and 67, which connect with an electrical switch 70, switch case 43 and wire coils 5 and 6.

As a means of making the machine sanitary, liquid tight and otherwise to protect the wire coils or solenoids and the machine as a whole from the injurious effects of moisture, water, etc., a housing or casing 68, for said machine, preferably of some suitable material which may be readily cleaned and washed, such as white enameled material, is provided and so attached to the machine as to be easily and quickly opened, as for instance, capable of being opened and closed for the purpose of removing and replacing the switch 46, or to make any necessary adjustments or repairs to the parts within said casing. The said casing, may, if desired, be hung and swung on hinges 80 and secured or locked by any suitable means such as a bolt arrangement 81.

As a means of easily directing and manipulating the machine during the exigencies of speedily splitting carcasses, the machine is provided with a handle member 69, attached rigidly to the double spool, said handle member being preferably curved, but which may be, if desired, changed to any suitable form, and provided with an electrical control switch 70, said switch acting as a main electrical control and being provided preferably with a light colored push button 71 and a dark colored push button 72, and an electric cord or wire 73 connecting said electrical switch 70 with the automatic switch 46 contained within the switch case 43.

74 denotes a modified form of casing provided with a pointed or tapered rear 75, which tapered rear fits into and follows the cut or split portion of a carcass, thus tending to keep the cutting member in a proper lateral position or relation to the direction of the vertebrae and spinal cord cavity.

In order to provide ventilation or air cooling means for the wire coils or solenoids 5 and 6 and to prevent same from overheating under long and continued operations, each of the flanges 2, 3 and 4 are provided with air openings 76, and said openings may be located at each corner of said flanges, or, if desired, may extend in greater numbers to encircle said wire coils or solenoids. Said openings may be provided, preferably at their upper ends with valves, such, as, for instance, valves opening upward as at 77, in Fig. 2. By this means of ventilation or cooling, the cool or fresh air enters at the openings in the flanges 3 and as said air becomes heated it rises and passes through the openings in the center flange 4 and up through the openings in flange 2 and out into the outside air, and thus making room for the entrance of fresh cool air to come in from below the flange 3.

As a means of providing the cutting member with a safety device and to assist in keeping the machine in proper lateral position relative to the vertebrae and spinal cord cavity, a guard or shield 78 is secured to the arms 17 either permanently by means of riveting 79 or other suitable means, such as being secured removably in position by means of screws or the like, said guard 78 adapted to move or reciprocate vertically with the arms 17. The lower extremity of said guard preferably tapering downwardly or terminating in a point at the top of the ball or knob guide, and may or may not be, secured directly to said guide, as desired.

In the operation of the machine of our invention it will not be necessary to employ buffers or buffer springs at the ends of the core 8, since the magnetic pull created and exerted in the coils of wire or solenoid 5 is opposite in direction to the magnetic pull in the coils of wire or solenoid 6, and as the electric current is switched out of one solenoid and into the other very quickly, the retarding force in the solenoid last energized would be sufficient to limit the last stroke of the core or plunger, especially as the length of the core could be adjusted properly to get the said retarding force to work efficiently.

We also wish it understood that the several parts of our machine may be united mechanically in any desired way other than the way shown in the accompanying drawings.

The means commonly used, consisting of two suitably supported parallel rails upon which rollers are adapted to work having hook members thereon from which the carcass may be suspended by securing a hind leg to each rail and then shifting the same into operative position for splitting by the usual hand method, we do not wish to employ. Instead, in carrying the machine of our invention into practice, the operation of the same is as follows, assuming the machine to be set up in operative position:

The carcass first has its rump bone or tail portion of the spinal column cut by the common method of sawing and the carcass hung or disposed at right angles to the usual position by both legs being suspended on each of the usual parallel overhead rails and moved on said overhead rails to the main rail to the point where the machine is (preferably) permanently stationed so that said machine may engage each carcass as it arrives, and as said carcass must pass the same route from the killing floor to the cooling rooms it is obvious that the time and labor which would otherwise be consumed in moving the machine from carcass to carcass is thus saved. As each carcass arrives at the machine with its breast toward the same, the machine is raised high enough by the operator to admit him to insert or place the knob or ball guide into the beginning of the spinal cord cavity, the operator pushes, say, the light colored button 71 which connects the current with the automatic switch 46, which in turn connects said current with the coils of the upper solenoid 5, immediately energizing same and magnetically drawing or pulling up the core 8 into said solenoid 5 quickly, the rod 9, collar 20 and cutting member 12, being also pulled upward and while they pass upward the horizontal projection 22 engages the curved face 23 of the automatic switch 46 which forces the beveled edge 27 under the curved end 29 of the contact means 25 to separate the contact pieces 32 and 36 from each other, thus breaking the electrical contact and cutting or switching the current out of the solenoid 5 and demagnetizing said solenoid, while at the same time, the lower end of the beveled edge 27 of the switch knife 24 has automatically been withdrawn from under the contact means or spring 26, the inherent tension of which closes the contact piece 32 down on the contact piece 36 thus closing or switching in the circuit which leads into the lower solenoid 6, magnetizing the core to pull it down, and thus to impart a rapid reciprocation to the core and by leaving the current on, the same will be continuously connected first into one coil and cut out of the other in such manner that a reciprocating movement, of considerable force, will be imparted rapidly to said core so that the cutting member will act efficiently in severing the spinal column.

While the machine is cutting or splitting its way through the carcass, its own weight will cause the guide 15 to remain in and follow the cavity, but in addition the guide is constantly kept in the spinal cord cavity by means of utilizing every one of the rapidly downward strokes of the rod 9, by means of the collar 20 striking the collar 19 and thus driving the arms 17 downward which in turn forces the guide down into the cavity ahead of each blow of the cutting edge of the cutting member or cleaver 12, and the weight of the machine and, if necessary, a slight downward pull on the handle member by the operator will cause the machine to move downwardly or descend as the cutting member progresses in cutting through the longitudinal center of the backbones, until the carcass has been split into two parts or sides of equal size.

When it is desired to have the machine come to a dead stop, the operator pushes, say, the dark colored push button 72, which cuts out the electrical current from the automatic switch altogether, thus both solenoids becoming demagnetized, the weight of the core 8, rod 9 and the member 12 causing said core, rod and cleaver to drop until the collar 20 and collar 19 settle against 10 of the bearing 11.

We are aware that carcass splitting machines have been invented having guides to follow down the spinal cord cavity, but these are all impracticable for the reason that they are oblong or elongated and as the spinal cord cavity of cattle and hogs are very small in diameter and said cavity curves downwardly both laterally and fore and aft when the carcass is hung up or suspended, such elongated guides are not adapted to take or follow the said curves, and get stuck and become immovable in said cavity, whereas the guide of our invention being approximately no larger in height than in width, such as being a knob or round or ball shaped, its occupation of the spinal cord cavity is identically and completely the same and forming in effect a universal joint or hinge between the cavity and machine regardless of what position the machine may take or assume relative to the said cavity, as will be noted by referring to Figs. 1 and 2 and especially to the various positions taken by the cutting member of our invention in dotted lines in Fig. 13, in which the top position illustrates the point where the ball-guide first is inserted into the cavity; the second position from the top showing the machine or cutting member disposed at an angle in front of the cavity; the third position showing the same disposed at an angle in the rear of the cavity; the fourth position showing the same practically at right angle to said cavity; while the last or lowest position shows the guide passing through the sharp curve of the cavity in the neck portion of a carcass being split, which performance would not be possible to an elongated guide of other carcass splitting machines.

It will be seen that regardless of what position the machine may take or be moved laterally or fore and aft, or laterally-fore-and-aft, or regardless of what spinal-cord cavity curvatures would be encountered, the knob or ball guide would not be retarded in its movement relative to said spinal-cavity.

The knob or ball guide of our invention is also adapted to take any of the lateral curves which are at times found and known as deformed spines or backs in the spinal cord cavities of cattle and hogs.

The operator is not required to adjust the machine of the invention centrally with respect to the spinal column, for the reason that the said knob or ball guide acts to automatically determine the position of said machine with reference to the spinal column.

The carcass may be easily and quickly split for substantially its entire length by our machine in the hands of an unskilled workman, it being necessary only to insert the guide within the spinal cord cavity and to lower said machine as the spinal column is severed by the reciprocating action of the cutting member.

While we have shown the guide 15 to be preferably movable reciprocally, we wish it understood that our invention of the knob or ball guide is adapted to also be used and suitably secured on either our or other types of carcass splitting machines, immovably, and its use thus not being confined to our particular type of machine.

It will be observed that the device is light and compact in construction, that it comprises a comparatively small number of parts, that said parts are housed or incased in a manner to prevent them from coming into contact with the carcass, and that the handle member is so positioned on the machine as to minimize the liability of injury to the operator during the splitting operation and that by the use of our invention, one man can do the work of a number of men supplied with the usual hand cleavers, and of a much better quality of splitting than is possible with the usual hand method of splitting carcasses.

Our machine can readily be modified in construction without departing from its spirit and scope, and we do not wish to be confined to the exact details of construction shown, as various modifications in detail will suggest themselves to the manufacturers.

Having thus fully described the invention, what we claim as new, and desire to secure by Letters Patent, is:

1. A carcass splitting machine provided with a cutter guiding arm having a knob guide.

2. A carcass splitting machine provided with a cutting member, and a knob guide preceding said cutting member.

3. A carcass splitting machine provided with a cutting member, said cutting member provided with a guard, and said guard adapted to reciprocate.

4. A carcass splitting machine provided with a cutting member, said cutting member provided with a guard adapted to reciprocate, and said guard provided with a guide.

5. A carcass splitting machine adapted to be suspended and turntd on a vertical axis, provided with a rod adapted to reciprocate, a cutting member secured to said rod, means for preventing said cutting member from turning on a vertical axis, a collar slidably mounted on said rod, arms extending from said collar to a guide, and a second collar secured to said rod.

6. A carcass splitting machine provided with cutting means, a housing or casing being tapered, and said housing or casing being located above said cutting means.

Signed at Chicago, in the county of Cook and State of Illinois, this 20th day of May, 1918.

HUGH E. CONGER.
CHARLES W. WALLER.